United States Patent [19]

Calmettes

[11] Patent Number: 4,803,758
[45] Date of Patent: Feb. 14, 1989

[54] CLAMP AND METHOD OF PRODUCING SAME

[75] Inventor: Lionel Calmettes, Ozoir La Ferriere, France

[73] Assignee: Establissements Caillau, Issy-Les-Moulineaux, France

[21] Appl. No.: 33,900

[22] Filed: Apr. 3, 1987

Related U.S. Application Data

[63] Continuation of Ser. No. 700,734, Feb. 11, 1985, abandoned.

[30] Foreign Application Priority Data

Feb. 17, 1984 [FR] France ................. 84 02451

[51] Int. Cl.4 .............................. B65D 63/00
[52] U.S. Cl. .................. 24/20 R; 24/20 EE; 24/274 R
[58] Field of Search ............ 24/20 R, 20 EE, 20 CW, 24/30.5 W, 274 R, 282, 284, 703; 292/307 R; 29/513

[56] References Cited

U.S. PATENT DOCUMENTS

| | | | |
|---|---|---|---|
| 814,758 | 3/1906 | Williamson | 24/20 EE |
| 2,035,351 | 3/1936 | Taylor | 24/20 EE |
| 2,646,940 | 7/1953 | Volz | 24/20 EEX |
| 3,258,822 | 7/1966 | Schlesch et al. | 24/284 |
| 3,747,172 | 7/1973 | Tarzian | . |
| 3,981,053 | 10/1976 | Kreuzer | . |
| 4,099,304 | 7/1978 | Luc | 24/274 R |
| 4,299,012 | 11/1981 | Oetiker | 24/20 WX |
| 4,308,648 | 1/1982 | Fay | . |
| 4,315,348 | 2/1982 | Oetiker | 24/20 W |

FOREIGN PATENT DOCUMENTS 1123889 10/1956 France .
2481764 11/1981 France .

Primary Examiner—Kenneth J. Dorner
Assistant Examiner—James R. Brittan
Attorney, Agent, or Firm—Lewis H. Eslinger; Jay H. Maioli

[57] ABSTRACT

Clamp of the type comprising a band, provided close to one of its ends with raised sections and having at its other end a lug equipped with means for fastening said raised sections. Said fastening means are constituted for example by a screw, of which the threads are engageable with said raised sections, and the lug is fixed on one end of a first piece of band, which first piece is in turn fixed on a second piece of band on the end of which are provided the raised sections.

4 Claims, 1 Drawing Sheet

CLAMP AND METHOD OF PRODUCING SAME

This is a continuation of application Ser. No. 700,734, filed Feb. 11, 1985, and now abandoned.

A clamp is already known from French Pat. No. 2 410 757, which is more particularly used with rubber pipes. This clamp consists of a band, generally in metal, provided close to one of its ends, with raised sections, and having, at its other end, a lug equipped with means for fastening the said raised sections.

A method is also known from published European Pat. No. 0089438, for producing a lug on the end of a metal band, which lug is adapted to receive a screw of which the threads can cooperate with the raised sections provided on the other end of the band.

Clamps of the aforesaid type, and in particular those produced according to the aforesaid method, are very satisfactory, but, their production in different diameter sizes from a one-piece band, may give rise to oversized thicknesses and/or lengths over most of the band, this causing an unnecessary waste of raw material, hence, high costs.

Other clamps are also known from U.S. Pat. Nos. 3,747,172 and 3,981,053, comprising two separately produced pieces which are joined together. The first piece contains the lug designed to receive the locking screw, and always has the same length regardless of the diameter of the clamp. The length of the second piece, on the contrary, is dependent on the diameter of the clamp and contains the raised sections designed to cooperate with the screw.

But all of these known clamps have rectilinear discontinuities, which extend crosswise of the band, through the width thereof, close to the point where the two pieces are joined together. This, in many cases, results in leakages of the clamped pipes.

It is therefore the object of the present invention to propose a clamp produced from two pieces of band, the fastening together of which pieces is so achieved as to eliminate the aforesaid disadvantages.

According to the invention, the end of the first piece of band, at the opposite of the lug, is provided, on the one hand, with a tongue-like shaped element and, on the other hand, and at the back of said tongue-like element, with two lateral tabs, folded over in the plane of said piece, so as to grip the end of the second piece opposite that containing the raised sections. Said end of the second piece is, on the one hand, correspondingly recesses to receive the tongue-like element of the first piece, and presents two lateral notches forming two seats for the lateral tabs of the first piece.

The invention will be more readily understood on reading the following description with reference to the accompanying drawings in which.

Figure 1:
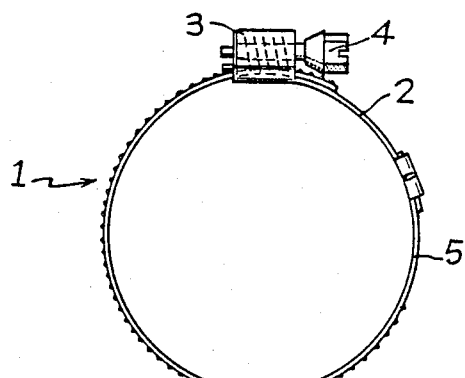
FIG. 1 is a side-face view of a clamp according to the invention.
Figure 2:
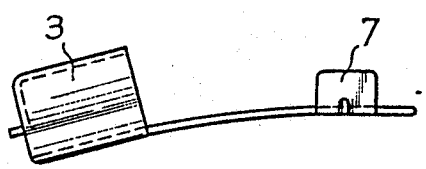
FIG. 2 is a side-face view, on a large scale, of the first piece of band.
Figure 3:
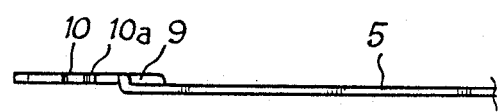
FIG. 3 is a side-face view, on a large scale, of the part where the second piece of band is joined up.
Figure 4:
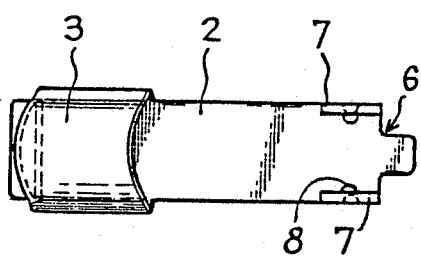
FIG. 4 is a plan view of the first piece of band.
Figure 5:
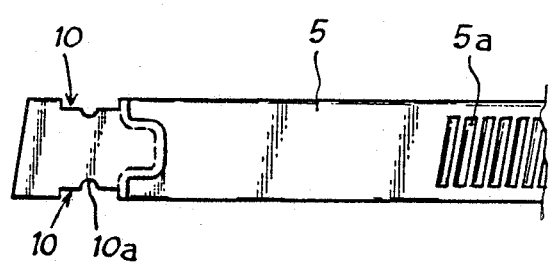
FIG. 5 is a plan view of the part where the second piece of band is joined up.
Figure 6:
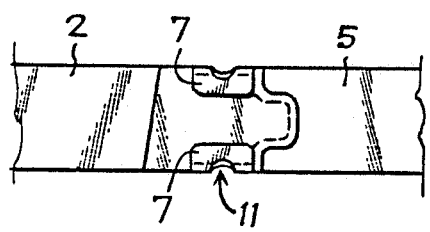
FIG. 6 is a side-face view of the assembly of two pieces of band.
Figure 7:
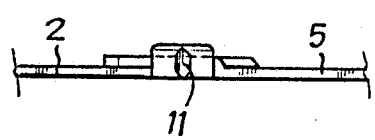
FIG. 7 is a plan view of the assembly of two pieces of band.

Referring first to FIG. 1, this shows a clamp 1 comprising a first piece of band 2 on which is fixed a lug 3 receiving a screw 4. A second piece of band 5 is joined to the first piece and its free end is provided with raised sections 5a designed to cooperate with the screw 4, once this is engaged in an elongated hole of the lug 3.

The two opposite ends of the first piece 2 and of the second piece 5 of the band, present (FIGS. 2 to 5) before they are assembled, appropriately complementary shapes permitting to fasten the two pieces of band one on the other, in conditions to be explained hereinafter.

More precisely, the end of the first piece 2 has formed therein a tongue-like element and immediately at the back of said tongue-like element 6 are provided two lateral tabs 7. Before assembly (FIGS. 2 and 4), said tabs 7, which are joined to the longitudinal edges of the piece of band 2, stand up perpendicularly to the plane of the latter.

Said piece of band 2, its lug 3, its tabs 7 and its tongue-like element 6 are produced by punching, folding and cutting operations such as those described in published application EP-A-No. 89438 for example. It may be an advantage to produce the ribbing 8 at the same time, by an appropriate stamping operation, in the inner angle formed by the band and each of the tabs 7. The role played by said ribbing will be explained hereinafter.

Moreover, the end of the second piece of band 5, which is opposite to the end containing the raised sections, comprises (FIGS. 3 to 5) a recess 9 which is complementary to the tongue 6 of the first piece of band 2. A the front of said recess 9, the band is provided with two notched portions 10, the depth of which corresponds to the thickness of the tabs 7. Preferably, and as illustrated in the figures, the bottom part of the notches 10 comprises at least one recess 10a, the role of which will become evident hereinafter.

A clamp such as that illustrated in FIG. 1 is produced as follows:

Supposing that a stock of first pieces of band such as described hereinabove is available. These can be used to produce clamps of any diameter sizes.

It is on the contrary necessary to have as many second pieces of band as there are diameters of clamps to be produced, the only difference between them being the length; but the ends opposite to the ends carrying the ribbing are identical.

The tongue-like element 6 of a first piece 2 is engaged under the recess 9 of a second piece 5, of suitable length, until the two complementary ends are engaged one into the other, and until the tabs have penetrated into notches 10 which constitute seats therefor. The tabs are then folded over downwards until they grip completely the recess 9 of the second piece of band 5, said second piece 5 being thus secured over the first piece 2.

It will be noted at this stage that all these operations can be carried out on automatic machines for mass production. The presence of the ribbing 8 gives good rigidity to the folded down tabs 7 and prevents them from lifting. The recesses 10a prevent any undue deformation of the tabs 7 and also contribute to the firmness of the fastening in that they constitute a housing for the ribbing 8.

But it may be preferred in certain cases to create the ribbing 8 after the tabs have been folded over, by a suitable stamping operation in 11 on their lateral edge. The existence of the recesses 10a makes such a final stamping operation easier.

The fastening together of the two pieces of band is quite strong and eliminates all the drawbacks of a removable assembly. Moreover, the presence of the tongue-like element 6 prevents the pipes equipped with a clamp according to the invention, from leaking at the level of the junction of the two pieces of band.

Finally and above all, the possibility of producing clamps of different diameters, from identical first pieces of band, is a great advantage from the point of view of costs.

What we claim is:

1. A clamp for encircling a pipe and being of the type comprising two pieces of band joined one to the other, a first piece having at one of its ends a lug equipped with means for fastening a number of raised sections provided on the other band, wherein the the end of the first piece of band, at the end opposite the lug is provided with a tongue element having sides extending in a direction for encircling the pipe and the first piece of said band further includes two lateral tabs formed out of and extending from the lateral edge of said first band piece at the base of said tongue element and adapted for folding over in the plane of said first piece, so as to grip the end of the second piece opposite that containing the raised sections while avoiding a rectilinear discontinuity at the inner face of the clamp near said lateral tabs and wherein said end of the second piece is correspondingly formed with a depression formed by a rimmed depression in the shape of said tongue element to receive the tongue element of the first piece and having wall portions extending in said direction for encircling the pipe, said end of the second piece having a thickness, at areas adjacent the rimmed depression, which is substantially equal in thickness to the remainder of the second piece and the thickness of the tongue element, and wherein said end of the second piece further includes a free end and two lateral notches forming two seats for the lateral tabs of the first piece, whereby a rectilinear discontinuity is avoided at the junction of the first and second pieces at the inner face of the clamp containing the pipe when the two pieces are joined together, with said second piece being secured over said first piece, and the entire end of the second piece from said depression to said seats to said free end laterally displaced from the remainder of the second piece by the thickness of the first piece.

2. A clamp as claimed in claim 1, wherein a respective base of the lateral notches of the second piece of band each presents at least one hollow recess constituting a respective seat and each of the tabs carried by the first piece includes a rib element for seating in said seat, respectively.

3. A method of manufacturing a clamp as claimed in claim 1, in which first the first piece of band and its lug and then the second piece of band are produced, including the steps of releasably engaging the tongue element of the first piece in the corresponding tongue-shaped recess of the second piece whereby a flat surface of the tongue element contacts the pipe; engaging the tabs of the first piece in the notches of the second piece, and folding the two tabs over the end of said second piece of band until this is fully gripped.

4. A method as claimed in claim 3, wherein at least one rib is created by stamping on the lateral edge of the tabs, which rib penetrates into a corresponding hollow recess provided in the notches of said second piece of band.

* * * * *